April 10, 1956  J. G. McKINLEY  2,741,267
FLEXIBLE HOSE
Filed April 8, 1948
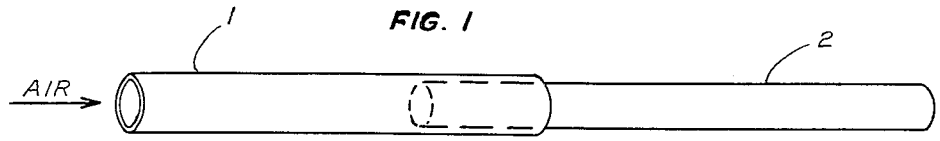
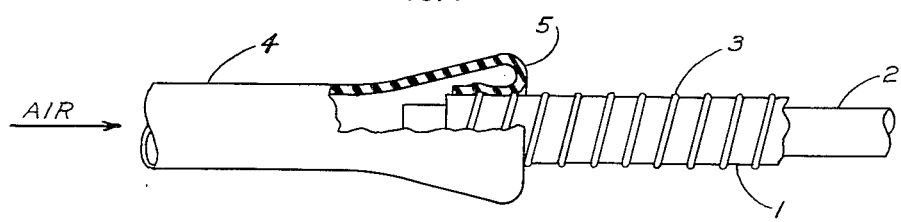
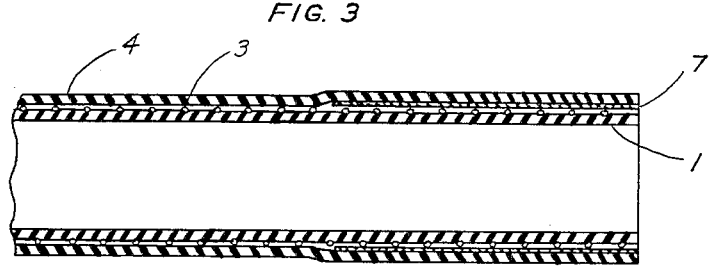
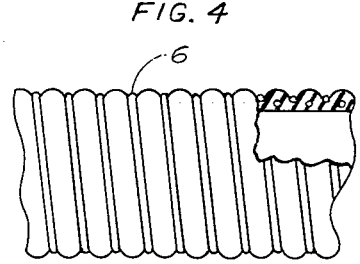 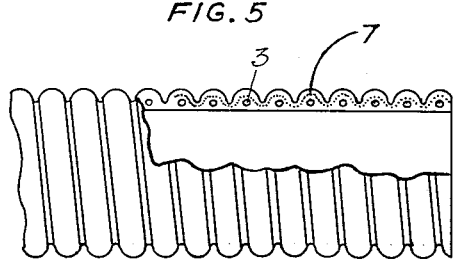
INVENTOR.
JAMES G. McKINLEY
BY
ATTORNEY

United States Patent Office 2,741,267
Patented Apr. 10, 1956

2,741,267

FLEXIBLE HOSE

James Guy McKinley, Waynesville, N. C., assignor to The Dayton Rubber Company, a corporation of Ohio Application April 8, 1948, Serial No. 19,798

2 Claims. (Cl. 138—56)

The present invention relates to a new and improved type of flexible conduit or hose. More particularly it relates to a highly flexible rubber conduit particularly designed to carry fluids containing suspended particles and being especially adapted to be used for fluids under suction or pressure.

Flexible hose or tubing is frequently used for carrying fluids either with or without finely divided material suspended therein. Such uses include transportation of grain or finely divided materials; such as, dust by means of carrier gases or suction, as well as the conduction of fluids under pressure as, for example, in carrying compressed air into pneumatic tools. Liquids may also be conveyed in similar tubing. In these applications it is highly desirable to provide hose or conduits having a high degree of strength and flexibility.

An important use of flexible hose is in connection with vacuum cleaners which are used in homes. A conventional type of vacuum cleaner hose is constructed with a spirally wound steel wire placed on the very inside of the hose. This hose is usually made by winding the wire on a steel mandrel which is held in place and caused to revolve. Immediately on top of the wire is placed a single layer of bias cut, rubber coated, square woven fabric. Next on top of the fabric and equidistant between turns of wire, is placed one strand of a low grade burlap yarn. The assembly described above is then vulcanized and subsequently removed from the mandrel. The vulcanized hose then has an outside braided covering applied. This operation is usually carried out by what is commonly known as a 64 carrier vertical hose braiding machine. Fittings are then applied to each end of the hose for connection to the appliance and to the tool.

The conventional type of hose referred to has numerous disadvantages. In the first place, the interior of the hose has an uneven surface due to the location of the spiral reinforcement which means that the hose becomes subject to clogging and abrasion by particles carried by the fluid. Furthermore, the braided outer surface tends to abrade readily and will, after a period of time, present an unsightly appearance. The wire reinforcement, being positioned on the inner surface of the hose, tends to separate from the rubber or fabric at points of strain. This type of hose also is not as flexible as it should be due to the fabric construction. Furthermore, the use of fabric necessitates the existence of one or more spiral seams and a longitudinal seam which are localities of weak construction. In addition, the fabric construction tends to permit a certain amount of leakage of air.

It is an object of the present invention to provide a hose having smooth inner and outer surfaces. It is a further object of the invention to provide a hose or conduit particularly adapted for use as a vacuum cleaner hose in which the inner surface has a smooth and continuous structure and which is strong as well as highly flexible. It is still a further object of the present invention to provide a vacuum cleaner hose which will minimize air leakage and will provide high strength and flexibility.

In accordance with the present invention, the improved hose is constructed of two concentric seamless rubber tubes with a wire or other suitable reinforcing material positioned between and held in place by the two tubes. In the manufacture of the hose a wire helix is spun over the inner tube. The outer tube is then positioned over the wire helix and another wire is then wound around the outer tube between the convolutions of the first wire under a tension sufficient to force the outer tube between these convolutions to give the outer surface a helical corrugated structure. The assembly is then vulcanized to form a unitary structure and the outer wire is then removed.

The tubes on which the product is formed may be composed of either natural rubber or synthetic rubber, such synthetic rubber including synthetic rubber-like materials of the type represented by Buna-S, Buna-N, neoprene and the like. In general such synthetic rubbers are formed by the polymerization of conjugated diolefins or their copolymerization with other monomers; such as, styrene, acrylonitrile or other unsaturated materials co-polymerizable therewith. The term "rubber" as used herein is intended to and does apply to both natural and synthetic rubbers or mixtures thereof as is well known to the art. The tubes may be entirely unvulcanized or "green" or may be partially or fully unvulcanized and, of course, contain any necessary compounding materials, vulcanizing agents, accelerators and the like, as is well known to the art.

The inner helical reinforcement is preferably disposed between two rubber layers or tubes each of substantially equal thickness, so that in the resulting product the reinforcing member is surrounded by rubber on all sides. After vulcanization the two rubber layers become integrally united with the helical wire being firmly embedded therein.

For further understanding of the invention and the manner of manufacturing the product in question, reference is made to the accompanying drawings in which Fig. 1 is a side elevation illustrating a first step in the preparation of the conduit. Fig. 2 is a side elevation, partially in cross section, illustrating one mode of applying the outer tube to the wire wound inner tube. Fig. 3 is a longitudinal vertical cross section through one end portion of the assembly formed in Fig. 2. Fig. 4 is a side elevation of a length of tubing, partially in cross section, showing a segment of the assembly of Fig. 3 after the outer wire has been wound around the outer tube. Fig. 5 is a view similar to that in Fig. 4 showing the final product after the removal of the outer wire.

A length of rubber tubing, preferably not cured of the desired internal diameter, is formed by extrusion or in any desired manner and is cut to the desired length. This tube is then blown or otherwise positioned upon a hollow cylindrical pole or mandrel 2 which conforms to the length of the desired final length of hose. A helix of steel wire 3 is then spun over the tube. Preferably, the wire is applied in open spaced turns. The wire may be galvanized, or may be black or liquor finish and will have a suitable amount of temper depending on the resiliency required in the final product. For example, the wire may have a diameter of .051" and may be spun with a ¼" spacing. The wire is spun with sufficient tension to firmly engage the tube without cutting into it.

The outer tube 4 is then formed by extrusion or otherwise, and if desired may be given a partial cure. Normally the tube is formed in a flat or collapsed condition and may be semicured in this way. The tube is then blown upon a mandrel and the outer surface is buffed and covered with a rubber cement and allowed to dry. The cement covered tube is then blown onto the wire covered tube as shown in Fig. 2, in such a manner that in doing so the outer tube is turned inside out so that the cement layer will contact the wire. This is accomplished as shown in the figure by turning the edge of the cement-covered surface 5 of the outer tube inward and slipping the turned-in portion over the end of the wire covered inner tube to start the inverting operation. The hose is then blown over the inner member to complete the operation and the resulting product will then have the structure shown in Fig. 3.

In an alternative procedure, a green tube may be extruded directly over the wire wound inner tube on the mandrel and then the assembly is partially cured.

Another wire helix 6 of the same type of wire is then spun over the outside cover with the same spacing but is staggered with respect to the inner wire so that the turns are between the turns of the inner helix. Sufficient tension is used so that the outer tube will be forced between convolutions of the inner wire. Since the outer tube has preferably been semi-cured, this may be accomplished without embedding the wire in the rubber. The assembly is then given a final cure and the product will have the structure shown in Fig. 4. Following the cure, the outer wire is removed to give the final product having the structure shown in Fig. 5.

An important procedure which is utilized in large-scale manufacture, involves the use of the outer wire which is removed from the product of Fig. 4 as the permanent inner reinforcement for use in the procedure described in connection with Fig. 2. This means that the wire used in each length of hose actually performs two functions since it is first used for the purpose of wrapping the outer tube and forming convolutions therein in one sequence of operations, after which it is then used as the inner helical reinforcement in forming another length of tubing in another sequence. Although the same wire might be used a number of times as the outer wrap and then discarded, this would involve a certain waste of wire and would fail to have the simplicity of operation provided by the use of the outer wire as the inner reinforcing member. In addition to the economies involved, this step possesses other advantages including the fact that the wire which has been previously used as the outer wrap is more or less preshaped so that it may be readily applied upon the inner tube in the succeeding operation. In actual practice a number of assemblies conforming to Fig. 4 would first be prepared and the outer wrapping wire from each of these would then be removed after curing and these lengths of wire then used as the inner reinforcements in an equal number of assemblies undergoing manufacture at the stage shown in Fig. 2 and the sequence of operations repeated any desired number of times utilizing the outer wire wrapping from one sequence as the inner reinforcing member in another sequence of steps.

The hose may be made in any desired diameter. In vacuum cleaner hose, for example, the inner tube may have an inside diameter of 1¼" with both tubes having a thickness of about 0.040".

Where the hose is to be connected to fittings as in the case of vacuum cleaner hose, it is frequently desired that there be somewhat less flexibility at the junction of the hose with the fittings in order to avoid excessive strain at such points. In order to increase flex life at such points, it is desirable to incorporate a short fabric layer 7 near either or both ends of the hose as shown, for example, in Figs. 3 and 5. This fabric layer is intended to extend only a minor portion of the length of the hose and generally will be from a few inches to about a foot in length depending on the length of the hose. The fabric layer is applied by winding a suitable fabric in strip form on a bias over the inner wire helix at either or both ends of the tube for the distance desired before positioning the outer tube thereon. Whatever the length of the hose, it is intended that the fabric reinforcement at the ends shall occupy only a minor portion of the total length.

The product in question is essentially one which is composed entirely of rubber with wire reinforcement except in cases where the fabric is used at the ends, said wire reinforcement being entirely surrounded by said rubber, the outer surface having a helical convolute structure imparting a high degree of flexibility to the product. The inner surface of the hose is perfectly smooth and offers no resistance to flow with consequent avoidance of abrasion and clogging. The outer surface also being smooth and being formed of rubber, is also more resistant to abrasion. The fact that the hose is constructed of two concentric or rubber seamless tubes minimizes leakage of air and consequently holds vacuum more effectively than conventional hose.

The use of wire as the outer wrapping has numerous advantages since it gives deeper and more uniform corrugations and may be readily removed to leave a smooth and unmarked surface; whereas the use of cord or yarn will leave an impression in the outer tube and will be difficult to remove without also removing some of the outer wrapping. In addition, the wire may be used as the permanent reinforcement in another length of tubing as described herein.

The hose has numerous applications where a high degree of strength and flexibility is required and where smooth inner and outer surfaces are advantageous.

The forms and procedures described herein are for the purpose of illustration and example only and only such limitations should be imposed on the invention as are set forth in the appended claims.

I claim:

1. A flexible rubber hose comprising an inner rubber tube having a substantially smooth and continuous inner rubber surface, a helical wire reinforcing member wound around said inner tube in spaced turns in direct contact therewith and firmly engaging said inner tube under tension, and an outer rubber tube having a helically convolute outer surface positioned over said helical wire member and concentric with said inner tube, said outer tube firmly engaging said wire member and in direct contact with said inner tube at all points between the turns of said helix under tension, whereby said wire reinforcement is entirely surrounded by and has its entire surface in direct contact with said inner and outer rubber tubes thereby defining the convolute outer surface, said inner and outer tubes and said wire reinforcement being integrally united by vulcanization, with said outer tube being directly and integrally united to the inner tube between each of the spaced turns of the helical wire member and to said wire member.

2. A flexible rubber hose according to claim 1 wherein a fabric layer is positioned over said wire member at each end of the hose between said inner and outer tubes for a relatively short distance from each end of the hose only in order to reduce the flexibility of the hose at the end portions thereof.

References Cited in the file of this patent

UNITED STATES PATENTS

| | | |
|---|---|---|
| 133,219 | Gatley | Nov. 19, 1872 |
| 1,314,670 | Juve et al. | Sept. 2, 1919 |
| 1,831,724 | Stokes | Nov. 10, 1931 |
| 1,838,056 | Harpfer | Dec. 22, 1931 |
| 2,176,762 | Forbes | Oct. 17, 1939 |
| 2,321,064 | Broedling | June 8, 1943 |
| 2,330,651 | Welger | Sept. 28, 1943 |
| 2,430,081 | Roberts et al. | Dec. 4, 1947 |
| 2,534,140 | Moore | Dec. 12, 1950 |
| 2,560,369 | Roberts | July 10, 1951 |